Sept. 6, 1938.  L. C. GOAD ET AL  2,129,127
MOLDING MACHINE
Original Filed Oct. 8, 1934  2 Sheets-Sheet 1
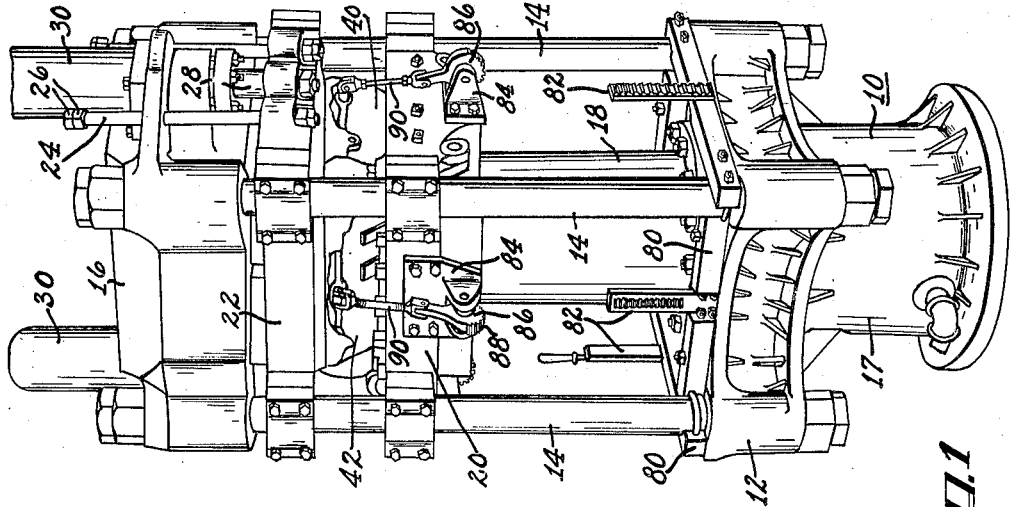
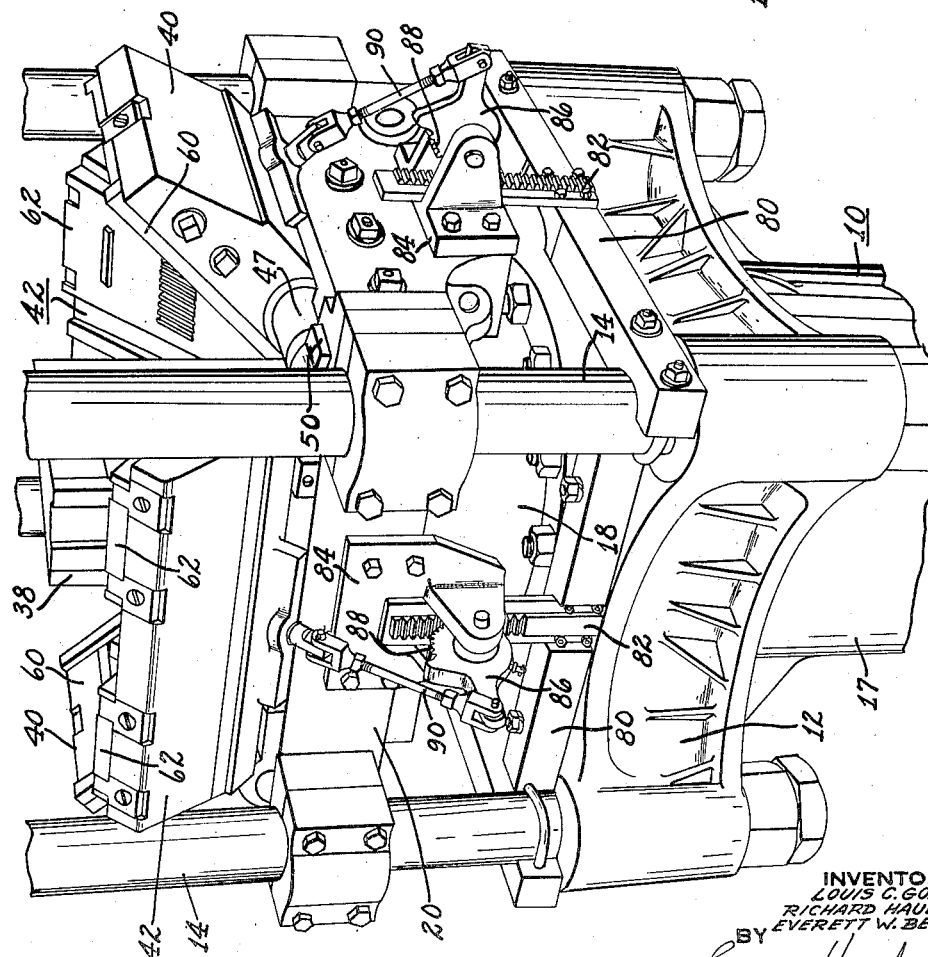
INVENTORS
LOUIS C. GOAD
RICHARD HAUBURSIN
EVERETT W. BEEKMAN
BY
Spencer Hardman & Fehr
Their ATTORNEYS Sept. 6, 1938.　　　L. C. GOAD ET AL　　　2,129,127
MOLDING MACHINE
Original Filed Oct. 8, 1934　　2 Sheets-Sheet 2
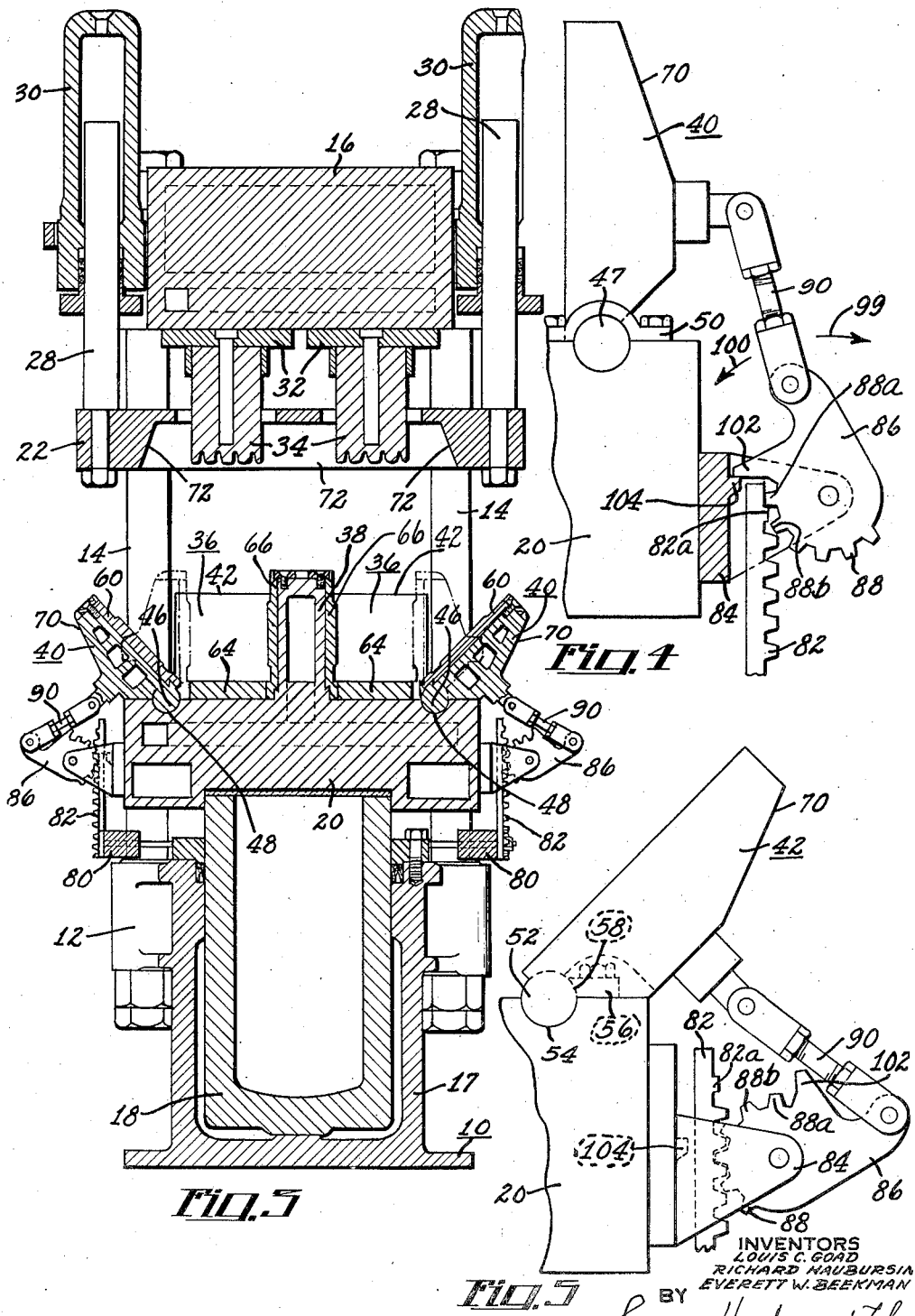

Patented Sept. 6, 1938

2,129,127

UNITED STATES PATENT OFFICE 2,129,127

MOLDING MACHINE

Louis C. Goad, Flint, Mich., and Richard Haubursin and Everett W. Beekman, Muncie, Ind., assignors to General Motors Corporation, Detroit, Mich., a corporation of Delaware Application October 8, 1934, Serial No. 747,384
Renewed July 15, 1937

9 Claims. (Cl. 18—19)

This invention relates to molding machines and more particularly to a molding machine having a collapsible mold.

It is an object of the present invention to provide for the automatic collapse of a mold to facilitate removal of a molded article therefrom.

It is another object of the present invention to provide for the automatic restoration of the collapsed mold.

Further objects and advantages of the present invention will be apparent from the following description, reference being had to the accompanying drawings wherein a preferred embodiment of the present invention is clearly shown.

In the drawings:

Fig. 1 is a perspective view of a molding machine embodying the present invention.

Fig. 2 is an enlarged fragmentary view of a part of the machine, showing a plurality of molds in a collapsed state.

Fig. 3 is a cross section through the machine showing the molds collapsed.

Figs. 4 and 5 are diagrammatic views illustrating the automatic collapse and restoration of the molds.

Referring to the drawings and particularly to Fig. 1, there is shown a conventional molding machine which in the present instance molds two conventional battery boxes. Since the disclosed molding machine is a conventional machine, the following short description of the same is ample to understand the invention which is closely related to the machine. The machine provides a base 10, terminating in a table 12 which by intermediation of a plurality of posts 14 supports a head 16 which is provided with steam passages. The base 10 provides a cylinder 17 in which is vertically slidable a ram 18, connected to a mold support 20 which is also provided with steam passages. This mold support 20 is guided for vertical movement by the posts 14. A mold locking plate 22 is also guided for vertical movement by the posts 14 and held in the lowermost position shown in Fig. 3 by means of a plurality of spindles 24 (see Fig. 1) which are secured to said locking plate, pass through the head 16 and threadedly receive nuts 26, adapted to rest on the head 16. Secured to the locking plate 22 are plungers 28 which cooperate with cylinders 30, secured in any suitable manner to the head 16. Fluid pressure is admitted to the cylinders 30 in any suitable manner and is adapted to urge the locking plate 22 into the lowermost position shown in Fig. 3. Attached in any suitable manner to the head 16 are two steel plates 32 and two steel cores 34, all of which have steam passages and together define the cavities and top surfaces of the two battery boxes to be molded in the present machine. Vertically aligned with the cores 34 are two molds 36 which are collapsible in order to facilitate the removal of the molded battery boxes therefrom. These two molds 36 are formed by a central partition 38, integral with the mold support 20, and two pairs of opposite rotatable gates 40 and 42 all of which are provided with steam passages. The gates 40 are provided with cylindrical ribs 46, extending throughout the length of the gates and terminating into projecting stubs 47. The mold support 20 is provided with semi-cylindrical bearing surfaces 48 which receive the cylindrical ribs 46. Bearing caps 50 rest on the projecting stubs 47 and are secured in any suitable manner to the mold support 20, thereby retaining the gates 40 in their bearing surfaces 48. The other pair of gates 42 is likewise provided with cylindrical ribs 52 which rest in semi-cylindrical bearing surfaces 54 of the mold support 20. These gates 42 are retained in their respective bearing surfaces 54 by means of a plurality of blocks 56 which are secured to the mold support 20 and bear with their circular surfaces 58 against the cylindrical ribs 52 of the gates 42. In this manner more than one-half of the cylindrical ribs 52 is embraced wherefore a lateral removal of the gates 42 from their respective bearing surfaces is impossible. Secured in any suitable manner to the gates 40 and 42 are steel plates 60 and 62 respectively, which define the outside shape of three walls of each of the two battery boxes molded in the instant machine. Secured in any suitable manner to the top of the mold support 20 are two steel plates 64 which define the bottom surfaces of the two battery boxes. The partition 38 is also provided with two steel plates 66 which define the outside shape of the fourth side wall of each of the two battery boxes. The various gates as well as the partition 38 are provided with suitable interfitting surfaces so that the gates in conjunction with the partition 38 form the closed molds 36, giving little rise to flash formation in the various divisions between the gates and between the latter and the partition. In the position of the mold support 20 shown in Fig. 3, the gates are open and the molds 36 therefore collapsed. Upon admission of fluid pressure to cylinder 17, the ram 18 and connected mold support 20 are raised, immediately causing the gates 40 and 42 to close the molds 36 by means to be described later. After the gates have closed or restored the molds 36 and while the ram 18 continues to raise the mold support 20 into the position shown in Fig. 1, the inclined surfaces 70 of all gates are engaged by the correspondingly inclined surfaces 72 of the locking plate 22 whereby interlocking pressure is applied to the gates since continued ascent of the mold support 20 is yieldingly resisted by the fluid pressure urged plungers 28 of the locking plate 22. The resistance offered by the locking plate 22 to the ascending mold support 20 naturally slows down the movement of the latter while the cores 34 are approached by the molds 36, whereby the previously deposited soft rubber sheets therein are gradually deformed into battery box shape and vulcanized, steam being conducted into the steam passages of the molds and cores as well as the head 16 and the mold support 20 in any convenient manner.

The molds 36 as well as the mold support 20 remain in the position shown in Fig. 1 for a certain length of time to insure a thorough vulcanization of the soft rubber. After the cylinder 17 is vented by the operator or automatically in any suitable manner, the fluid pressure urged locking plate 22 will strip the molds and the molded battery boxes therein from the cores 34, leaving the battery boxes in the molds 36. After the locking plate 22 has reached the lowermost position shown in Fig. 3, the molds 36 as well as the mold support 20 continue to descend by gravity into the mold charging position shown in Fig. 3. During such descent of the mold support 20, the gates 40 and 42 are opened by mechanism to be described presently.

Secured in any suitable manner to the stationary table 12 and the posts 14 are four bars 80 to each of which is secured a vertically extending rack 82. Secured in any suitable manner to the four sides of the movable mold support 20 are bearing brackets 84 which rotatably support levers 86, provided with gear teeth 88, adapted to mesh with the teeth of the racks 82. A lengthwise adjustable link 90 connects each lever 86 with one of the gates 40 or 42. The mold support 20 assumes momentarily during its uninterrupted descent the position shown in Fig. 4 in which a tooth 88a of each lever 86 meshes with the topmost tooth 82a of a rack 82. Upon the continued descent of the mold support 20 from the position shown in Fig. 4, consecutive teeth 88 of the levers 86 mesh with the racks 82 whereby the levers 86 are rotated in their bearing brackets from the position shown in Fig. 4 into that shown in Figs. 2, 3 and 5, causing the gates 40 and 42 to open by intermediation of the links 90. Figs. 2, 3 and 5 disclose the lowermost position of the mold support 20 in which the teeth 88 of the levers 86 are in mesh with the racks 82. After the operator of the machine has removed the exposed battery boxes from the collapsed molds 36 and has deposited soft rubber sheets therein, he again will admit fluid pressure in any suitable fashion to cylinder 17 so as again to cause the mold support 20 and the parts carried thereby to ascend. Immediately after the mold support starts to ascend, the levers 86 will be rotated from the position shown in Fig. 5 into that shown in Fig. 4, due to the cooperation between the lever teeth 88 and the racks 82. It will be observed from Fig. 4 that the topmost tooth 82a of each rack 82 is shortened so as to clear the lever teeth 88b during the continued ascent of the mold support 20. It will be further observed from Fig. 4, that at the time the lever teeth 88 demesh from the racks, the gates 40 and 42 have just closed the molds 36 and remain in that position by their own gravity as can be more readily observed from the dot-and-dash position of the gates 40 in Fig. 3. The levers 86 have been rotated by the racks 82 into the position shown in Fig. 4 in which the pivot points of the links 90 and the axis of rotation of the levers 86 are beyond linear alignment. In order to open the gates it will therefore be necessary to rotate the levers and links into and beyond linear alignment in the direction of arrow 99 in Fig. 4. Further rotation of the levers 86 and links 90 in the direction of arrow 100 in Fig. 4 due to accidental opening of one or more gates in any conceivable manner during their ascent is also forestalled since the levers 86 are provided with lugs 102 which bear against shoulders 104 of the bearing brackets 84. Therefore, the gates 40 and 42 are retained in mold closing position not only by their own gravity but also by the links 90 and the levers 86 in the just explained manner.

It can be understood from the foregoing that the gates are automatically opened and closed entirely in response to movement of the mold support.

While the embodiment of the present invention as herein disclosed, constitutes a preferred form, it is to be understood that other forms might be adopted, all coming within the scope of the claims which follow.

We claim:

1. In a molding device, the combination of two cooperating mold elements, one being stationary and the other being movable and one of the mold elements having a hinged wall for opening and closing said mold element; meshing rack and gear segment members, one of said members being movable relative to the other, and the segment member being rotatably mounted on the mold element having the hinged wall; a link connecting the hinged wall with the gear segment eccentrically thereof; and a single fluid pressure cylinder and piston means for effecting relative movement between the mold elements and relative movement between the rack and segment members.

2. In a molding device, the combination of two cooperating mold elements, one being stationary and the other being movable and one of the mold elements having a wall hinged for rotation about an axis transverse to the direction of movement of the movable mold element, said wall normally remaining in closing position by gravity; meshing rack and gear segment members, one of said members being movable relative to the other; a link connecting said wall with an eccentric portion of the segment; said rack extending at right angles to the axis of rotation of the hinged wall, said segment mounted upon the mold element having the hinged wall and rotatable about an axis parallel to the axis of rotation of the hinged wall and the rack and segment demeshing from each other when the hinged wall assumes mold closing position prior to complete interfitting of the two mold elements, and an end tooth of the segment being in meshable alignment with the rack when the wall is in mold closing position; and a single fluid pressure cylinder and piston means for effecting relative movement between the mold elements and relative movement between the rack and segment members.

3. In a molding device, the combination of two cooperating mold elements, one being stationary and the other being movable and one of the mold elements having a wall hinged for rotation about an axis transverse to the direction of movement of the movable mold element, said wall normally remaining in closing position by gravity; a stop provided by the mold element having the hinged wall; meshing rack and gear segment members, one of said members being movable relative to the other; a link connecting said wall with an eccentric portion of the segment; said rack extending at right angles to the axis of rotation of the hinged wall, said segment having a shoulder and being mounted upon the mold element having the hinged wall and rotatable about an axis parallel to the axis of rotation of the hinged wall, and the rack and segment demeshing from each other when the hinged wall assumes mold closing position prior to the complete interfitting of the mold elements, and an end tooth of the segment being in meshable alignment with the rack when said wall is in mold-closing position, the shoulder being so located relative to the segment as to engage said stop when the wall is in closed position in which the point of attachment of the link with the segment has traveled slightly beyond a line connecting the axis of the segment with the point of attachment of the link with the movable wall; and a single fluid pressure cylinder and piston means for effecting relative movement between the mold segments and relative movement between the rack and segment members.

4. In a molding device, the combination of two cooperating mold elements, one mold element having a movable wall to provide for the opening and closing of said mold element; means for moving one mold element relative to the other; meshing rack and gear segment members; means for moving one of said members relative to the other directly in response to relative movement between said mold elements; means supporting the gear segment in fixed relation to the mold element having the movable wall; and a link connecting the movable wall with the gear segment eccentrically thereof.

5. In a molding device, the combination of two cooperating mold elements, and one of the mold elements having a wall hinged for rotation about an axis transverse to the direction of movement of the movable mold element, said wall normally remaining in closing position by gravity; means for moving one mold element relative to the other; meshing rack and gear segment members; means for moving one of said members relative to the other directly in response to relative movement between said mold elements; and a link connecting said wall with an eccentric portion of the segment; said rack extending at right angles to the axis of rotation of the hinged wall, said segment being mounted upon the mold element having the hinged wall and rotatable about an axis parallel to the axis of rotation of the hinged wall and the rack and segment demeshing from each other when the hinged wall assumes mold closing position prior to complete interfitting of the two mold elements, and an end tooth of the segment being in meshable alignment with the rack when the wall is in mold-closing position.

6. In a molding device, the combination of two cooperating mold elements, one of the mold elements having a wall hinged for rotation about an axis transverse to the direction of movement of the movable mold element, said wall normally remaining in closing position by gravity; means for moving one mold element relative to the other; a stop provided by the mold element having the hinged wall; meshing rack and gear segment members, means for moving one of said members relative to the other directly in response to relative movement between said mold members, a link connecting said wall with an eccentric portion of the segment; said rack extending at right angles to the axis of rotation of the hinged wall, said segment having a shoulder and being mounted upon the mold element having the hinged wall and rotatable about an axis parallel to the axis of rotation of the hinged wall and the rack and segment demeshing from each other when the hinged wall assumes mold closing position prior to the complete interfitting of the mold elements and an end tooth of the segment being in meshable alignment with the rack when said wall is in mold-closing position, the shoulder being so located relative to the segment as to engage said stop when the wall is in closed position in which the point of attachment of the link with the segment has traveled slightly beyond a line connecting the axis of the segment with the point of attachment of the link with the movable wall.

7. In a molding device, the combination of a fixed upper mold element, a vertically movable lower mold element having a wall hinged upon a horizontal axis; a hydraulic cylinder supporting the upper mold element; a ram within the cylinder and supporting the lower mold element; a rack also supported by said cylinder; a gear segment meshing with said rack and pivotally supported by said ram upon a horizontal axis; and a link connecting the hinged wall with the gear segment eccentrically thereof.

8. In a molding device, the combination of a fixed upper mold element, a vertically movable lower mold element having a wall hinged upon a horizontal axis, said wall normally remaining in closing position by gravity; a hydraulic cylinder supporting the upper mold element; a ram within the cylinder and supporting the lower mold element; a rack also supported by said cylinder; a gear segment meshing with said rack and pivotally supported by said ram upon a horizontal axis; and a link connecting the hinged wall with the gear segment eccentrically thereof, the rack and segment demeshing from each other when the hinged wall assumes mold closing position prior to complete interfitting of the two mold elements, and an end tooth of the segment being in meshable alignment with the rack when the wall is in mold closing position.

9. In a molding device, the combination of a fixed upper mold element, a vertically movable lower mold element having a wall hinged upon a horizontal axis; a stop provided by the lower mold element; a hydraulic cylinder supporting the upper mold element; a ram within the cylinder and supporting the lower mold element; a rack also supported by said cylinder; a gear segment meshing with said rack and pivotally supported by said ram upon a horizontal axis, and provided with a shoulder; and a link connecting the hinged wall with the gear segment eccentrically thereof, the rack and segment demeshing from each other when the hinged wall assumes mold closing position prior to the complete interfitting of the mold elements and an end tooth of the segment being in meshable alignment with the rack when said wall is in mold closing position, the shoulder being so located relative to the segment as to engage said stop when the wall is in closed position in which the point of attachment of the link with the segment has traveled slightly beyond a line connecting the axis of the segment with the point of attachment of the link with the movable wall.

LOUIS C. GOAD.
RICHARD HAUBURSIN.
EVERETT W. BEEKMAN.